US009375790B2

(12) United States Patent
Murphy et al.

(10) Patent No.: US 9,375,790 B2
(45) Date of Patent: Jun. 28, 2016

(54) CONTINUOUS FLOW REACTOR AND METHOD FOR NANOPARTICLE SYNTHESIS

(71) Applicant: The Board of Trustees of the University of Illinois, Urbana, IL (US)

(72) Inventors: Catherine J. Murphy, Urbana, IL (US); Samuel E. Lohse, Urbana, IL (US); Jonathan R. Eller, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 391 days.

(21) Appl. No.: 13/950,726

(22) Filed: Jul. 25, 2013

(65) Prior Publication Data

US 2014/0026714 A1    Jan. 30, 2014

Related U.S. Application Data

(60) Provisional application No. 61/708,243, filed on Oct. 1, 2012, provisional application No. 61/676,184, filed on Jul. 26, 2012.

(51) Int. Cl.
*B22F 9/24* (2006.01)
*B22F 9/16* (2006.01)
*B22F 1/00* (2006.01)
*B82Y 30/00* (2011.01)

(52) U.S. Cl.
CPC .............. *B22F 9/16* (2013.01); *B22F 1/0025* (2013.01); *B22F 9/24* (2013.01); *B82Y 30/00* (2013.01)

(58) Field of Classification Search
None
See application file for complete search history.

(56) References Cited

U.S. PATENT DOCUMENTS 7,811,543 B2 * 10/2010 Didenko ............... B22F 9/24
423/509
2012/0048064 A1 * 3/2012 Kasper ............... B01J 23/745
75/362

OTHER PUBLICATIONS

Alvarez-Puebla, Ramón A. et al., "Gold nanorods 3D-supercrystals as surface enhanced Raman scattering spectroscopy substrates for the rapid detection of scrambled prions," *Proceedings of the National Academy of Sciences USA*, 108, 20 (2011) pp. 8157-8161.
Boleininger, Johann et al., "Microfluidic continuous flow synthesis of rod-shaped gold and silver nanocrystals," *Physical Chemistry Chemical Physics*, 8 (2006) pp. 3824-3827.
Bullen, Craig et al, "A seedless approach to continuous flow synthesis of gold nanorods," *Chemical Communications*, 47 (2011) pp. 4123-4125.
Chan, Emory M. et al., "High-Temperature Microfluidic Synthesis of CdSe Nanocrystals in Nanoliter Droplets," *Journal of the American Chemical Society*, 127, 40 (2005) pp. 13854-13861.
(Continued)

Primary Examiner — George Wyszomierski
(74) Attorney, Agent, or Firm — Brinks Gilson & Lione

(57) ABSTRACT

A continuous flow reactor for nanoparticle synthesis comprises a modular system including a plurality of interconnected tubular components for fluid flow therethrough including a first tubular inlet and a second tubular inlet connected to a three-way junction comprising a tubular mixer. A continuous flow method for nanoparticle synthesis comprises flowing a growth solution and a reaction-initiating solution into a mixing portion of a flow reactor to form a mixed solution; flowing the mixed solution through a holding portion of the flow reactor for a predetermined residence time to form a reacted solution comprising nanoparticles; and continuously removing the reacted solution from the flow reactor so as to achieve a throughput of nanoparticles of at least about 0.5 mg/min.

11 Claims, 11 Drawing Sheets

(56) References Cited

OTHER PUBLICATIONS

Cutler, Joshua I. et al., "Polyvalent Nucleic Acid Nanostructures," *Journal of the American Chemical Society*, 133 (2011) 9254-9257.

Dahl, Jennifer A. et al., "Toward Greener Nanosynthesis," *Chemical Reviews*, 107, 6 (2007) pp. 2228-2269.

Dickerson, Erin B. et al., "Gold nanorod assisted near-infrared plasmonic photothermal therapy (PPTT) of squamous cell carcinoma in mice," *Cancer Letters*, 269 (2008) pp. 57-66.

Dreaden, Erik C. et al., "The golden age: gold nanoparticles for biomedicine," *Chemical Society Reviews*, 41 (2012) pp. 2740-2779.

Duraiswamy, Suhanya et al., "Droplet-Based Microfluidic Synthesis of Anisotropic Metal Nanocrystals," *Small*, 5, 24 (2009) pp. 2828-2834.

Gao, Jinxin et al., "Dependence of the Gold Nanorod Aspect Ratio on the Nature of the Directing Surfactant in Aqueous Solution," *Langmuir*, 19, 21 (2003) pp. 9065-9070.

Gole, Anand et al., "Polyelectrolyte-Coated Gold Nanorods: Synthesis, Characterization and Immobilization," *Chemistry of Materials*, 17, 6 (2005) pp. 1325-1330.

Gole, Anand et al., "Seed-Mediated Synthesis of Gold Nanorods: Role of the Size and Nature of the Seed," *Chemistry of Materials*, 16, 19 (2004) pp. 3633-3640.

Gou, Linfeng et al., "Fine-Tuning the Shape of Gold Nanorods," *Chemistry of Materials*, 17, 14 (2005) pp. 3668-3672.

Hao, Liangliang et al., "Nucleic Acid-Gold Nanoparticle Conjugates as Mimics of microRNA," *Small*, 7, 22 (2011) pp. 3158-3162.

Hill, Haley D. et al., "The bio-barcode assay for the detection of protein and nucleic acid targets using DTT-induced ligand exchange," *Nature Protocols*, 1, 1 (2006) pp. 324-336.

Hribar, Kolin C. et al., "Enhanced Release of Small Molecules from Near-Infrared Light Responsive Polymer-Nanorod Composites," *ACS Nano*, 5, 4 (2011) pp. 2948-2956.

Huang-et al., "Spatiotemporal Temperature Distribution and Cancer Cell Death in Response to Extracellular Hyperthermia Induced by Gold Nanorods," *ACS Nano*, 4, 5 (2010) pp. 2892-2900.

Huang, Xiaohua et al., "Gold Nanorods: From Synthesis and Properties to Biological and Biomedical Applications," *Advanced Materials*, 21 (2009) pp. 4880-4910.

Huang, Youju et al., "Dark-field microscopy studies of polarization-dependent plasmonic resonance of single gold nanorods: rainbow nanoparticles," *Nanoscale*, 3 (2011) pp. 3228-3232.

Hutchison, James E., "Greener Nanoscience: A Proactive Approach to Advancing Applications and Reducing Implications of Nanotechnology," *ACS Nano*, 2, 3 (2008) pp. 395-402.

Jana, Nikhil R., "Gram-Scale Synthesis of Soluble, Near-Monodisperse Gold Nanorods and Other Anisotropic Nanoparticles," *Small*, 1, 8-9 (2005) pp. 875-882.

Jana, Nikhil R. et al., Seeding Growth for Size Control of 5-40 nm Diameter Gold Nanoparticles. *Langmuir*, 17, 22 (2001) pp. 6782-6786.

Jones, Matthew R. et al., "Plasmonically Controlled Nucleic Acid Dehybridization with Gold Nanoprisms," *ChemPhysChem*, 10 (2009) pp. 1461-1465.

Kooij, E. Stefan et al., "Shape and size effects in the optical properties of metallic nanorods," *Physical Chemistry Chemical Physics*, 8 (2006) pp. 3349-3357.

Marre, Samuel et al., "Synthesis of micro and nanostructures in microfluidic systems," *Chemical Society Reviews*, 39 (2010) pp. 1183-1202.

McKenzie, Lallie C. et al., "Determining Nanoparticle Size in Real Time by Small-Angle X-ray Scattering in a Microscale Flow System," *Journal of Physical Chemistry C*, 114, 50 (2010) pp. 22055-22063.

Murphy, Catherine J., "Sustainability as an emerging design criterion in nanoparticle synthesis and applications," *Journal of Materials Chemistry*, 18, 19 (2008) pp. 2173-2176.

Ni, Weihai et al., "Tailoring Longitudinal Surface Plasmon Wavelengths, Scattering and Absorption Cross Sections of Gold Nanorods," *ACS Nano*, 2, 4 (2008) pp. 677-686.

Nusz, Greg J. et al., "Label-Free Plasmonic Detection of Biomolecular Binding by a Single Gold Nanorod," *Analytical Chemistry*, 80, 4 (2008) pp. 984-989.

Orendorff, Christopher J. et al., "Quantitation of Metal Content in the Silver-Assisted Growth of Gold Nanorods," *Journal of Physical Chemistry B*, 110, 9 (2006) pp. 3990-3994.

Sardar, Rajesh et al., "Gold Nanoparticles: Past, Present, and Future," *Langmuir*, 25, 24 (2009) pp. 13840-13851.

Sau, Tapan K. et al., "Seeded High Yield Synthesis of Short Au Nanorods in Aqueous Solution," *Langmuir*, 20, 15 (2004) pp. 6414-6420.

Si, Satyabrata et al., "Short Gold Nanorod Growth Revisited: The Critical Role of the Bromide Counterion," *ChemPhysChem*, 13 (2012) pp. 193-202.

Song, Jae Hee, "Crystal Overgrowth on Gold Nanorods: Tuning the Shape, Facet, Aspect Ratio, and Composition of the Nanorods," *Chem. Eur. J.*, 11 (2005) pp. 910-916.

Song, Yujun et al., "Microfluidic Synthesis of Nanomaterials," *Small*, 4, 6 (2008) pp. 698-711.

Sweeney, Scott F. et al., "Rapid Purification and Size Separation of Gold Nanoparticles via Diafiltration," *Journal of the American Chemical Society*, 128, 10 (2006) pp. 3190-3197.

Wagner, J. et al., "Microfluidic generation of metal nanoparticles by borohydride reduction," *Chemical Engineering Journal*, 135S (2008) pp. S104-S109.

Yang, Sung-Yi et al., "Size-controlled synthesis of gold nanoparticles using a micro-mixing system," *Microfluid Nanofluid*, 8 (2010) pp. 303-311.

\* cited by examiner

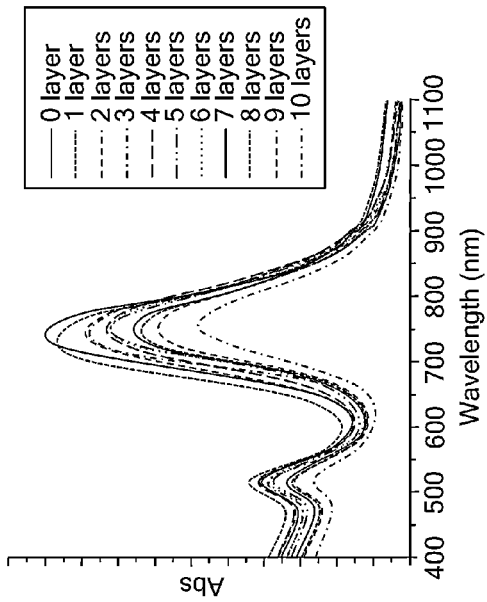
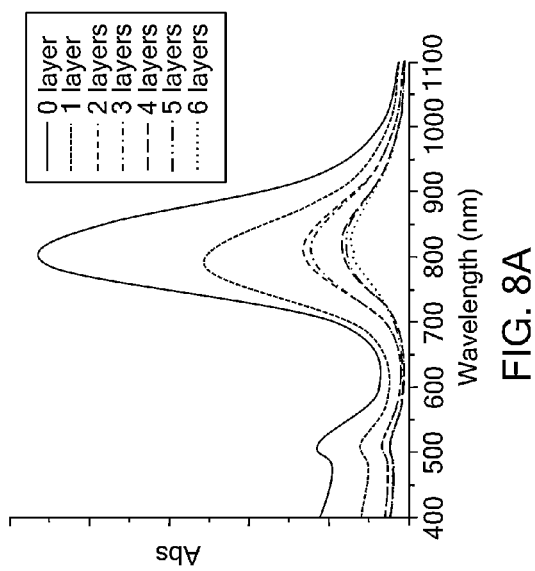
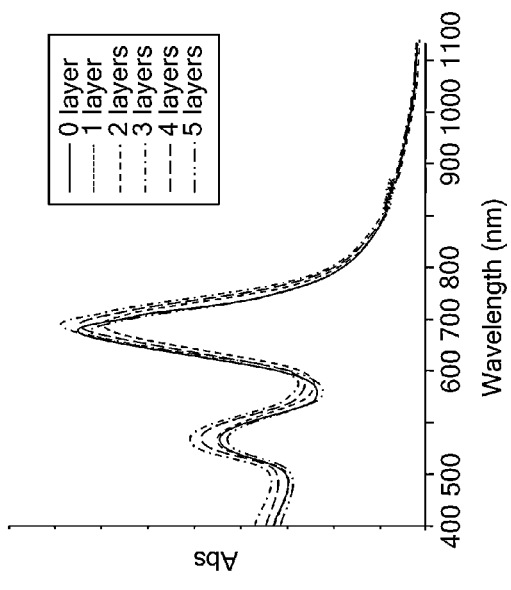
FIG. 8A
FIG. 8B
FIG. 8C

US 9,375,790 B2

CONTINUOUS FLOW REACTOR AND METHOD FOR NANOPARTICLE SYNTHESIS

RELATED APPLICATIONS

The present patent document claims the benefit of priority under 35 U.S.C. §119(e) to U.S. Provisional Patent Application No. 61/708,243, filed Oct. 1, 2012, and to U.S. Provisional Patent Application No. 61/676,184, filed Jul. 26, 2012, both of which are hereby incorporated by reference in their entirety.

TECHNICAL FIELD

The present disclosure is related generally to nanoparticle production and more particularly to a continuous flow reactor and method for nanoparticle synthesis and processing.

BACKGROUND

Despite sustained interest in the optical, electronic, and theranostic applications of functionalized nanomaterials, their controlled and reproducible synthesis, particularly above the milligram scale, remains a challenge. Most functionalized nanoparticles (NPs) are still synthesized using discovery-phase synthetic strategies (low-yield, high-waste, low-throughput) and purification approaches which are inefficient and generally not amenable to scale up. As nanotechnology enters a more application-oriented phase, however, kilogram-scale quantities of monodisperse NPs may be desperately needed to verify NP performance in biomedical applications, develop prototype devices, and adequately assess their potential toxicity.

For instance, it has been calculated that, in order to supply every person on earth with a 10 nm thick, 2.25 $cm^2$ monolayer of gold nanoparticles (e.g., as a standardized dose for theranostic anti-cancer treatments), gold nanoparticles would have to be reliably produced on the 100 kg scale. Currently, even though gold nanoparticle (AuNP) synthesis has been extensively researched for decades, few synthesis methods produce AuNPs on greater than a 50 mg scale. A typical approach, the standard seeded-growth synthesis of gold nanorods (AuNRs), produces less than 10 mg of AuNRs per batch.

Though it may seem conceptually simple, the scaling up of gold nanoparticle synthesis is a significant challenge; increasing the concentration of the reagents in the growth solution, or even the volume of the reaction, can significantly alter the rates reagent diffusion and thermal transport, effectively resulting in a loss of control over product properties. In order to meet the demand for nanoparticles for testing and prototype development, it would be advantageous to develop new strategies and infrastructure for nanomaterial synthesis.

BRIEF SUMMARY

Described herein are a continuous flow reactor and flow method for nanoparticle production and processing that may circumvent some of the shortcomings of traditional batch synthesis approaches. The new flow reactor and method may enable, for example, improved control over reagent addition, higher reproducibility, real-time product monitoring, and high-throughput synthesis.

The continuous flow reactor for nanoparticle synthesis comprises a modular system including a plurality of interconnected tubular components for fluid flow therethrough. The interconnected tubular components include a first tubular inlet and a second tubular inlet connected to a three-way junction comprising a tubular mixer.

The continuous flow method for nanoparticle synthesis comprises flowing a growth solution and a reaction-initiating solution into a mixing portion of a flow reactor to form a mixed solution; flowing the mixed solution through a holding portion of the flow reactor for a predetermined residence time to form a reacted solution comprising nanoparticles; and continuously removing the reacted solution from the flow reactor so as to achieve a throughput of nanoparticles of at least about 0.5 mg/min.

BRIEF DESCRIPTION OF THE DRAWINGS

FIG. 8A-8C shows comparative UV-vis absorbance data for AuNRs purified by centrifugation, an optimized centrifugation process, and tangential flow filtration, respectively.

DETAILED DESCRIPTION

Here, the construction and operation of a simple millifluidic reactor assembled entirely from commercially available components are described. Although the channels of the millifluidic reactor are significantly larger than those of microfluidic devices (millimeter-scale versus micron-scale in diameter), the new reactor can provide many of the proposed advantages of microfluidic devices for nanoparticle synthesis. For example, the millimeter-scale reaction channels permit small volume elements to mix discretely, yet are less susceptible to fouling than microscale reaction channels. In addition, individual components of the reactor can be swapped out or rearranged as needed without the need to fabricate an entirely new reactor.

The millifluidic reactor facilitates the high-throughput synthesis of a variety of functionalized nanoparticles, including gold nanospheres with tightly controlled core diameters and gold nanorods with controlled aspect ratios between 1.5 and 4.0. The absolute dimensions and the aspect ratio of gold nanorods may be controlled, and a new type of gold nanorod can be produced—a "small" gold nanorod with comparable optical properties yet smaller absolute dimensions than gold nanorods synthesized using typical seeded growth methods. In addition, the high-throughput synthesis approach facilitated by the flow reactor permits, for the first time, the rapid synthesis of monodisperse gold nanorods above the gram scale. It is also shown that the reactor can be adapted to enable the high-throughput functionalization of gold nanorods and real-time monitoring of gold nanoparticle products.

Figure 1A:
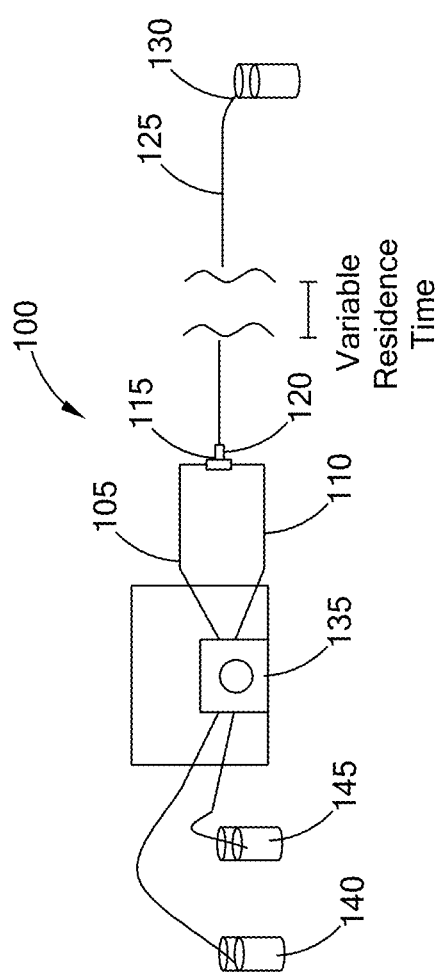
FIG. 1A shows a schematic of a millifluidic flow reactor including, in this example, commercially available polyvinyl Tygon® tubing connected by polyethylene mixers and driven by a peristaltic pump.
Figure 1B:
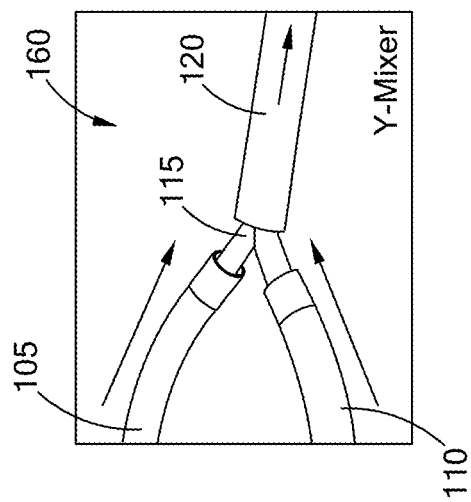
FIG. 1B provides a close-up view of an exemplary y-mixer.
Figure 1C:
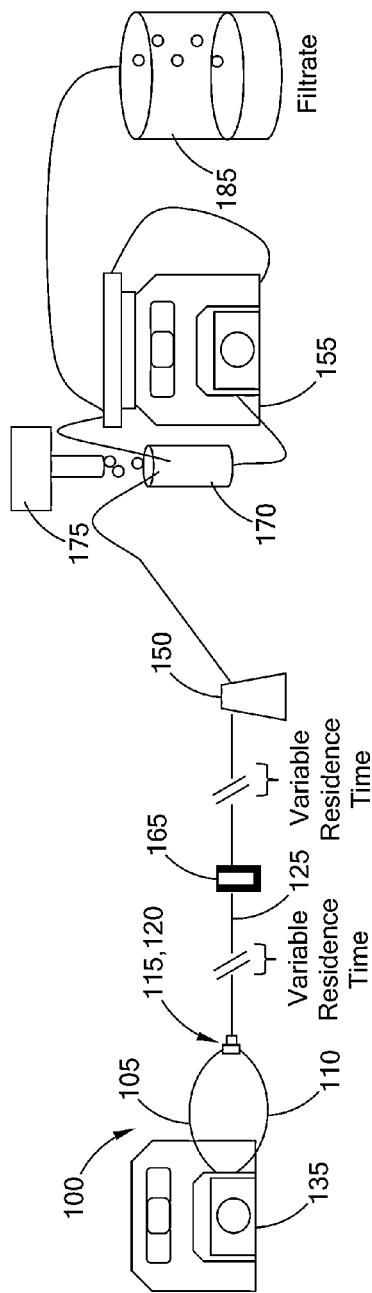
FIG. 1C shows a schematic of an alternative embodiment of the flow reactor including an integrated functionalization and flow-based purification system. The reactor may include a commercially available tangential flow filtration cartridge attached to a second peristaltic pump in order to provide mild, high-throughput purification to facilitate nanoparticle functionalization.

Referring to FIGS. 1A-1C, a schematic of an exemplary continuous flow reactor for nanoparticle synthesis is shown. The reactor 100 comprises a modular system including a plurality of interconnected tubular 160 components. The system is described as modular since the interconnected tubular components may be easily removed and replaced and are typically provided in standard sizes. The tubular components 160 include a first tubular inlet 105 and a second tubular inlet 110 connected to a three-way junction 115 comprising a tubular mixer 120. Mixing of two initially separate fluid streams flowed through the first and second tubular inlets 105, 110 is facilitated by the geometry of the junction 115, which merges the two separate streams into a mixed solution and may take the form of a Y-junction or a T-junction, for example. In addition, the tubular mixer 120 may include one or more protruding or indented features on an inner surface thereof to further promote mixing within the merged fluid stream.

As described in greater detail below, one of the initial fluid streams may comprise a growth solution 140 and the other may comprise a reaction-initiating solution 145. After a sufficient residence time in the flow reactor 100, the mixed solution may comprise a reacted solution that includes nanoparticles, or functionalized nanoparticles that further include a surface capping agent. A predetermined length of tubing 125 may extend downstream from the tubular mixer 120 to an outlet 130 of the modular system, where the length of tubing 125 may determine the residence time.

The reactor 100 may further comprise a pump (e.g., a peristaltic pump) 135 upstream of and in fluid communication with the first and second tubular inlets 105, 110 to drive the fluid streams through the reactor 100 at a desired flow rate. The flow reactor 100 may also include a purification system (e.g., a tangential flow filtration system) 150 downstream of the tubular mixer 120 for removal of impurities from the reacted solution and a second pump 155 (e.g., a peristaltic pump) to drive fluid through the purification system 150.

Each of the interconnected tubular components 160 of the flow reactor 100, which may be described as a millifluidic reactor, may have an inner diameter of at least about 0.5 mm and no more than about 10 mm. More typically, the inner diameter is from about 1 mm to about 10 mm and may be from about 1 mm to about 4 mm. The length of tubing 125 that extends downstream from the tubular mixer 120 to an outlet 130 of the modular system may be, for example, from about 180 cm to about 1830 cm in a typical flow reactor. Typically, the length is from about 180 cm to about 540 cm.

For flow in a tubular component (or pipe), the Reynolds number Re may be defined as:

$$Re = \frac{\rho v D_H}{\mu} = \frac{v D_H}{\nu} = \frac{Q D_H}{\nu A}$$

where:

$D_H$ is the hydraulic diameter, which is equivalent to the inner diameter of the tubular component in the case of a circular cross-section (m).

Q is the volumetric flow rate ($m^3/s$).

A is the pipe cross-sectional area ($m^2$).

v is the mean velocity of an object relative to the fluid (m/s).

$\mu$ is the dynamic viscosity of the fluid (kg/(m·s)).

$\nu$ is the kinematic viscosity ($\nu=\mu/\rho$) ($m^2/s$).

Referring to TABLE 1, Reynolds numbers were evaluated for two different flow rates: 5.0 mL/min (8.3E-08 $m^3/s$) and 5,000.0 mL/min (8.3E-05 $m^3/s$). These flow rates may apply to the growth solution, the reaction-initiating solution and/or the mixed solution. The Reynolds number was also evaluated at four different tubing IDs (1.0 mm, 1.79 mm, 3.3 mm, and 10.0 mm). Given possible geometries of and flow rates through the continuous flow reactor, the reactor may comprise a Reynolds number of at least about 2, at least about 10, at least about 100, at least about 1,000, at least about 2,500, at least about 5,000, at least about 10,000, or at least about 20,000 for fluid flow therethrough. Generally, the Reynolds number is no more than about 50,000, and it may also be no more than about 30,000, no more than about 20,000, or no more than 15,000. In some cases, the Reynolds number may be no more than about 5,000, no more than about 2,000, or no more than about 500. For example, the Reynolds number may be from about 2 to 100, particularly in the case of lower flow rates (e.g., about 5 mL/min or less) or the Reynolds number may be from about 2,500 to about 30,000, particularly in the case of higher flow rates (e.g., about 3000-7000 mL/min).

TABLE 1

Exemplary Flow Conditions, Geometries, and Reynolds Numbers for Fluid Flow through the Millifluidic Flow Reactor

|  | ID = 1 mm | ID = 1.79 mm | ID = 3.3 mm | ID = 10 mm |
|---|---|---|---|---|
| Flow rate (higher) ($m^3/s$) | 8.30E−05 | 8.30E−05 | 8.30E−05 | 8.30E−05 |
| Hydraulic diameter (m) | 0.001 | 0.00179 | 0.0033 | 0.01 |
| Kinematic viscosity ($m^2/s$) | 1.00E−06 | 1.00E−06 | 1.00E−06 | 1.00E−06 |
| Cross-sectional area ($m^2$) | 3.14E−06 | 1.30E−05 | 3.40E−05 | 3.20E−04 |
| Reynolds number | 26,400 | 11,500 | 8,060 | 2,590 |
| Flow rate (lower) ($m^3/s$) | 8.30E−08 | 8.30E−08 | 8.30E−08 | 8.30E−08 |
| Hydraulic diameter (m) | 0.001 | 0.00179 | 0.0033 | 0.01 |
| Kinematic viscosity ($m^2/s$) | 1.00E−06 | 1.00E−06 | 1.00E−06 | 1.00E−06 |
| Cross-sectional area ($m^2$) | 3.14E−06 | 1.30E−05 | 3.40E−05 | 3.20E−04 |
| Reynolds number | 26.4 | 11.5 | 8.1 | 2.6 |

Figure 2:
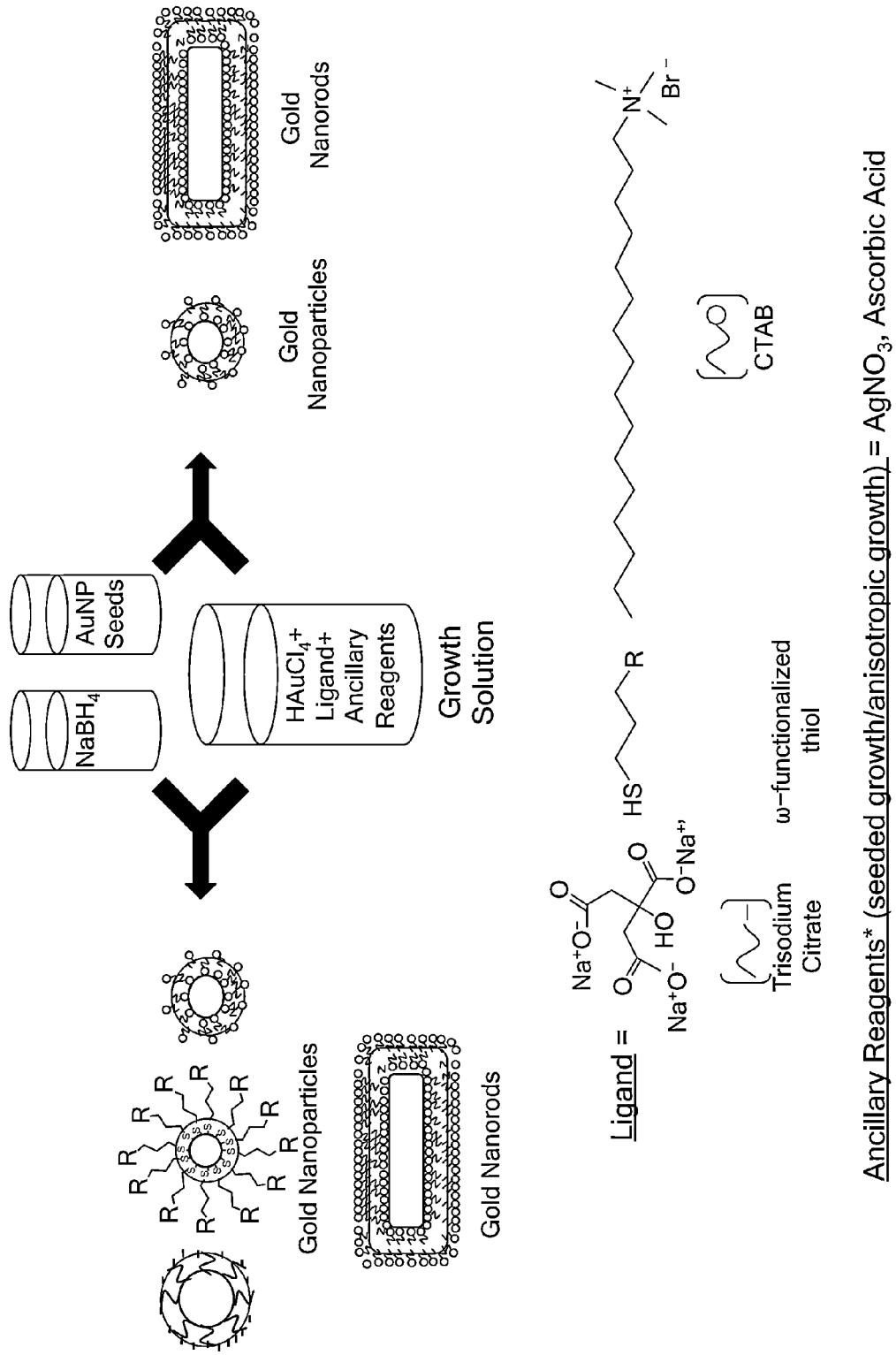
FIG. 2 provides a schematic of AuNP synthetic strategies that may be employed in the millifluidic flow reactor.

FIG. 2 provides a schematic of synthetic strategies that may be employed in the millifluidic flow reactor to produce gold nanoparticles (AuNPs). For example, gold nanoparticle formation may be initiated by the addition of a reaction-initiating solution that may include either sodium borohydride or small gold nanoparticle seeds to a growth solution containing combinations of gold tetrachloroaurate ($HAuCl_4$), capping agents or ligands (e.g., trisodium citrate, functionalized thiols, and/or CTAB), and ancillary reagents (if needed). Various sizes and shapes of AuNPs, including spherical and rod-shaped AuNPs, can be successfully prepared using this technique. For example, a seeded growth approach using gold nanoparticle seeds can be used to prepare CTAB-stabilized gold nanoparticles ($d_{core}$ 20-40 nm, for example) or gold nanorods (aspect ratio (AR) 1.5-4, for example). In another example, a direct reduction approach using sodium borohydride can be used to prepare CTAB-stabilized gold nanoparticles ($d_{core}$<8.0 nm) and gold nanorods, as well as spherical gold nanoparticles functionalized with citrate or ω-functionalized thiols.

A continuous flow method for nanoparticle synthesis includes flowing a growth solution and a reaction-initiating solution into a mixing portion of a flow reactor to form a mixed solution, flowing the mixed solution through a reaction portion of the flow reactor for a predetermined residence time to form a reacted solution comprising nanoparticles, and continuously removing the reacted solution from the flow reactor so as to achieve a throughput of nanoparticles of at least about 0.5 mg/min.

A flow rate of each of the growth solution and the reaction-initiating solution into a mixing portion can be at least about 2 mL/min, at least about 5 mL/min, at least about 10 mL/min, at least about 30 mL/min, or at least about 50 mL/min. The flow rate may also be no more than about 500 mL/min, or no more than about 200 mL/min. In some embodiments, the flow rate may be much higher, such as at least about 1,000 mL/min, at least about 2,500 mL/min, or at least about 5,000 mL/min. Typically, the flow rate is no more than about 20,000 mL/min, or no more than about 10,000 mL/min. The predetermined residence time can be about 60 min or less, about 30 min or less, about 10 min or less, about 5 min or less, and in some embodiments about 3 min or less. Typically, the predetermined residence time is at least about 1 min, at least about 2 min, at least about 5 min, at least about 10 min, or at least about 20 min.

The growth solution may include a gold precursor, such as gold (III) chloride, a surfactant, and/or ancillary reagents. The ancillary reagents may include one or more of silver nitrate and ascorbic acid, for example. The surfactant can comprise CTAB, trisodium citrate, or functionalized thiols.

The reaction-initiating solution may include a seed solution and/or a reducing agent. To synthesize gold nanoparticles, the seed solution may comprise gold nanoparticle seeds. If a reducing agent is used, sodium borohydride may be selected.

The reacted solution includes nanoparticles, which may be gold nanoparticles, at a concentration of at least about 1 nM or at least about 3 nM. The nanoparticles may be functionalized nanoparticles that comprise a surface capping agent, as discussed further in the examples below. In some embodiments, the nanoparticles have an aspect ratio of from about 1.5 to about 5 or from about 1.5 to about 4. Accordingly, the nanoparticles may be nanorods. Alternatively, the nanoparticles may have a spherical, acicular, cubic, irregular, or other morphology.

As set forth above, flow through the millifluidic reactor (e.g., the growth, reaction-initiating, and/or reacted solution) may comprise a Reynolds number of at least about 2, at least about 10, at least about 100, at least about 1,000, at least about 2,500, at least about 5,000, at least about 10,000, or at least about 20,000 for fluid flow therethrough. Generally, the Reynolds number is no more than about 50,000, no more than about 30,000, no more than about 20,000, or no more than about 15,000. In some cases, the Reynolds number may be no more than about 5,000, no more than about 2,000, or no more than about 500. In one example, the Reynolds number may be from about 20,000 to about 50,000.

An exemplary and simple millifluidic flow reactor has been assembled entirely from commercially available Tygon® polyvinyl tubing (e.g., 2.79 mm ID), polyethylene or Teflon mixers, and joints. Mixing of solutions within the reactor 100 may be aided by a peristaltic pump 135 (FIGS. 1A and 1C) that can drive fluid flow through the system at flow rates between 1.0-100.0 mL/min. As described above, gold nanoparticle synthesis can be initiated through the mixing of two solutions: a growth solution 140 and a reaction initiator solution 145 (containing either a reducing agent such as sodium borohydride or seed solution (e.g., gold nanoparticle seeds)) by diffusion in a simple three-way mixer 120 (e.g., a Teflon Y-mixer), and the residence time can be controlled by varying the length of tubing 125 between the mixer 120 and the outlet port 130. Following mixing and residence within the reactor 100, the reacted solution comprising gold nanoparticles may be collected and stirred (e.g., in an aqua regia-cleaned Erlenmeyer holding flask) prior to purification. The synthesis can be integrated with real-time UV-vis absorbance spectroscopy analysis to enable product monitoring, and the reactor can also be integrated with existing flow-based purification techniques (e.g., diafiltration).

The millifluidic reactor enables high-throughput synthesis for a variety of gold nanoparticles including, for example, CTAB-stabilized spheres, w-functionalized thiol-stabilized spheres, citrate-stabilized gold spheres, and CTAB-stabilized gold nanorods, while maintaining appropriate control over nanoparticle size and aspect ratio. The AuNPs synthesized within the reactor show slightly superior monodispersity versus corresponding batch syntheses, even though the reactor permits synthesis of gold nanoparticles at higher concentrations than can typically be achieved in batch syntheses. It is also shown that the flow reactor provides an opportunity to manipulate the dimensions of gold nanorods during synthesis in novel ways; for instance, it provides a means to synthesize gold nanorods with identical aspect ratios, but different absolute dimensions. In addition, the use of the millifluidic reactor provides a means to quickly produce a gram of gold nanorods with precisely controllable aspect ratio in less than four hours. The quality of the products can be monitored in real-time using UV-vis absorbance spectroscopy. Finally, the use of the peristaltic pump to drive the flow reactor also provides an opportunity to alter the reactor setup to facilitate high-throughput AuNP functionalization. The millifluidic (or capillary) flow reactor effectively facilitates high-throughput gold nanoparticle synthesis, purification/functionalization, with integrated real-time analysis.

In general, seeded growth syntheses are employed for the production of CTAB-stabilized spherical gold nanoparticles and CTAB-stabilized gold nanorods, while direct borohydride-mediated synthesis may be employed for the production of citrate-stabilized, ω-functionalized thiols, small CTAB-stabilized AuNPs, and small gold nanorods (FIG. 2). Simply by continuously running the flow reactor, any of these syntheses can be easily scaled up to provide gram-scale or larger quantities of functionalized gold nanoparticles. Detailed analyses of the quality of gold nanoparticles produced in flow have been undertaken, particularly with respect to their dispersity and surface chemistry, as described below.

Example 1

Synthesis of Gold Nanoparticles with Controlled Size, Shape, and Surface Chemistry The millifluidic reactor is a versatile platform for nanoparticle synthesis, suitable for the synthesis of a number of different types of functionalized gold nanoparticles with controlled sizes and shapes. For example, it is possible to synthesize citrate (Cit)-stabilized, mercaptohexanoic acid (MHA)-stabilized, and CTAB-stabilized spherical AuNPs, and CTAB-stabilized gold nanorods (AuNRs) within the millifluidic flow reactor. CitAuNPs, MHA-AuNPs, and small CTAB-AuNPs ($d_{core}$<10.0 nm) were prepared by direct reduction with sodium borohydride. Larger CTAB-AuNPs and CTAB-stabilized AuNRs were prepared using seed-mediated growth techniques. Within the reactor, the size and dimension of all particles may be controlled by varying synthesis parameters such as ligand:Au ratio and $AgNO_3$ concentration.

Figure 3A:
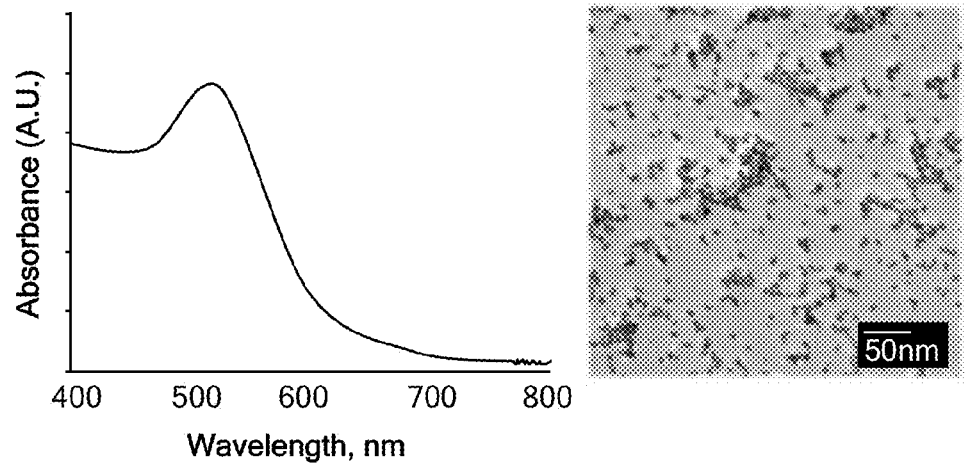
FIGS. 3A-3C provide UV-vis absorbance spectra and TEM images of citrate-stabilized AuNPs, MHA-stabilized AuNPs, and CTAB-stabilized AuNPs, respectively, demonstrating that spherical AuNPs with precisely controlled sizes and different stabilizing ligands can be readily synthesized in the millifluidic flow reactor.
Figure 3B:
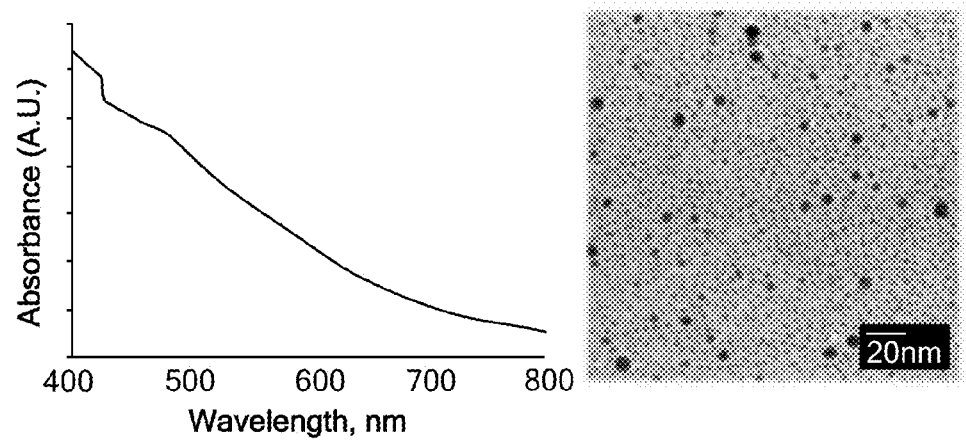

FIGS. 3A and 3B provide evidence that spherical AuNPs with precisely controlled sizes and different stabilizing ligands can be readily synthesized in the millifluidic flow reactor. FIG. 3A shows a UV-vis absorbance spectrum and TEM image of 4.0 nm citrate-stabilized AuNPs. The core diameter was determined by TEM to be 4.9±1.4 nm, N=987. Scale bar is 50 nm. FIG. 3B shows a UV-vis absorbance spectrum and TEM image of 2.0 nm MHA-stabilized AuNPs. The core diameter of these AuNPs was determined to be 2.2±0.5 nm, N=989. Scale bar is 20 nm.

Cit-AuNPs and MHA-AuNPs were synthesized by direct reduction with sodium borohydride. The citrate-stabilized AuNP solution was red-orange in color, possessing a weak surface plasmon resonance absorption maximum ($\lambda$max) of 517 nm (TABLE 2). As indicated above, TEM analysis indicated a core diameter of 4.9±1.4 nm (N=987, FIG. 3A) for the Cit-AuNPs. The MHA-AuNP solution was a deep brown color with an extremely weak plasmon absorbance indicating the formation of AuNPs with a core diameter less than 3.0 nm. TEM analysis of these particles gave the core diameter as 2.2±0.5 nm (N=989, FIG. 3B), as noted above.

Figure 3C:
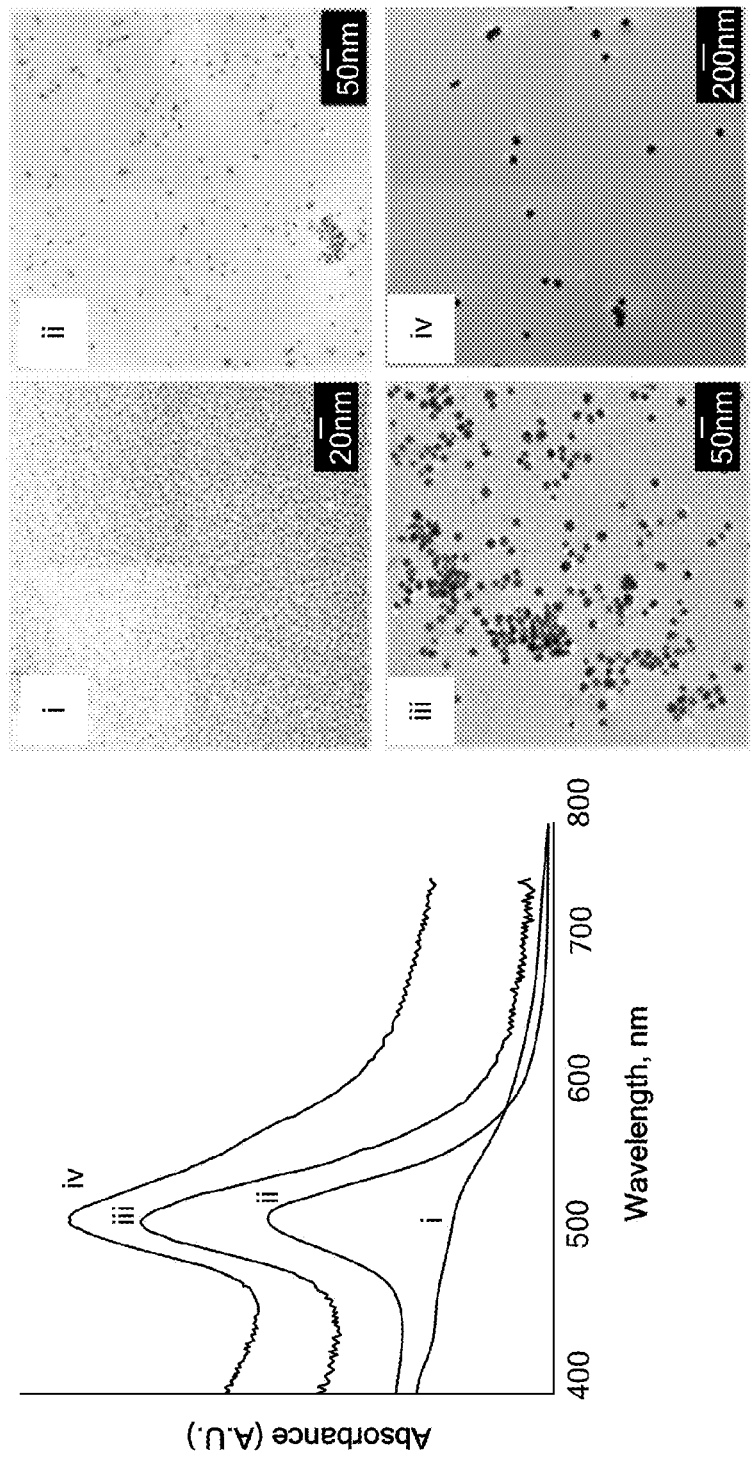

CTAB-stabilized AuNPs with precisely controlled sizes were synthesized using a combination of direct reduction with sodium borohydride and seeded growth techniques. This combination can quickly generate a library of CTAB-stabilized AuNPs that spans a wide variety of core diameters between 2.0-40.0 nm. FIG. 3C shows UV-vis absorbance spectra of 2.0 nm (i), 10.0 nm (ii), 20.0 nm (iii), and 40.0 nm (iv) CTAB-stabilized gold nanoparticles and associated TEM images for the CTAB-stabilized gold nanoparticles. The core diameter of the 2.0 nm CTAB AuNPs was determined to be (i) 2.1±0.3 nm, N=1603; scale bar is 20 nm. The core diameter of the 10.0 nm CTAB AuNPs (ii) was determined to be 8.2±2.0 nm, N=745; scale bar is 50 nm. The core diameter of the 20.0 nm CTAB-AuNPs (iii) was determined to be 20.7±4.5 nm, N=402; scale bar is 50 nm. The core diameter of the 40.0 nm CTAB-AuNPs (iv) was 37.1±2.1 nm, N=150; scale bar is 200 nm.

Direct borohydride reduction was used to synthesize CTAB-stabilized gold nanoparticles with core diameters less than 8.0 nm. By varying the $BH_4$:Au ratio, it was possible to synthesize CTAB-AuNPs with core diameters of 2.0±0.4 nm (N=453) and 8.2±2.0 nm (N=745), as determined by TEM (see FIG. 3C, i and ii, and TABLE 2). Larger CTAB-AuNPs can be prepared by using the 8.0 nm CTAB-AuNPs as seeds in a standard seeded growth procedure. This produces CTAB-AuNPs with a core diameter of 20.7±4.5 nm (N=402). These can, in turn, be used as seeds in the synthesis of 40.0 nm CTAB AuNPs (37.0±2.7 nm, N=150). The synthesis of CTAB-AuNPs with controlled sizes over such a wide range of core diameters shows that the millifluidic reactor described herein can be used to prepare a wide range of AuNP sizes, yet maintain tight control over the core diameter dispersity.

Figure 4:
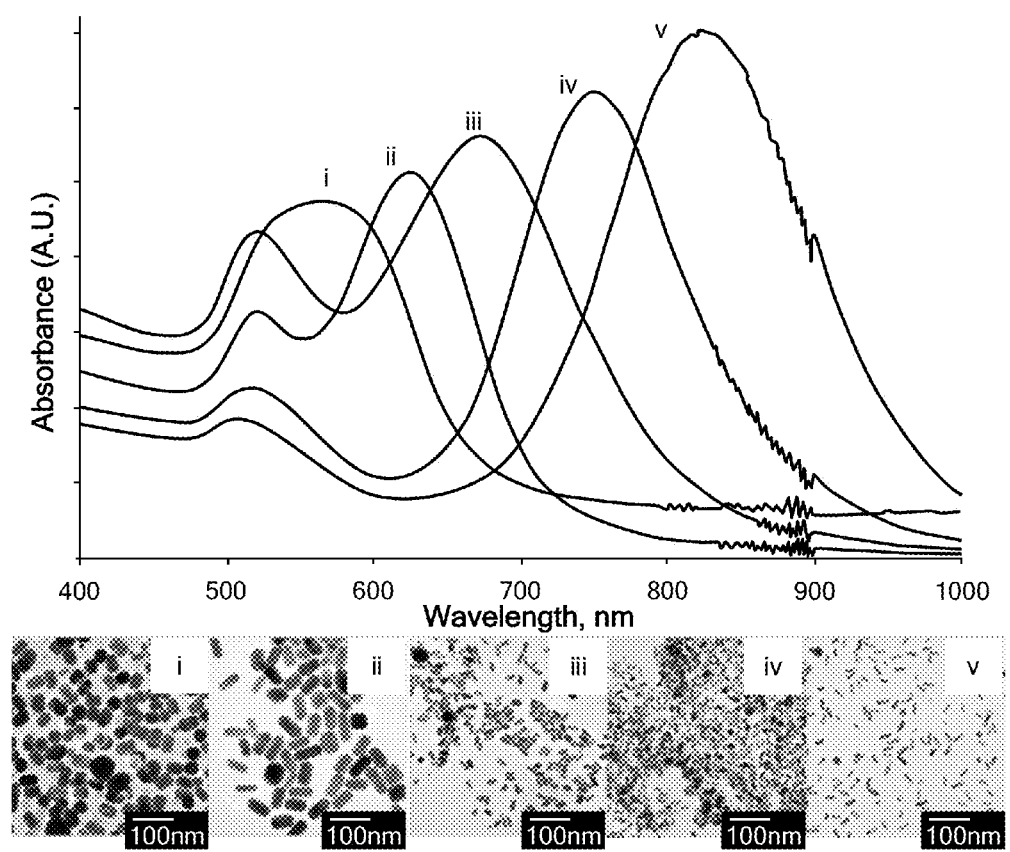
FIG. 4 shows UV-vis absorbance spectra and TEM images for gold nanorods of varying aspect ratio prepared within the flow reactor using a seeded growth approach.

The synthesis of AuNPs in the millifluidic flow reactor has been extended to produce AuNRs with controlled aspect ratio. In order to prepare gold nanorods, small CTAB-stabilized gold seeds may be mixed in the reactor with growth solution for seeded rods, resulting in the formation of CTAB-stabilized gold nanorods as determined by UV-vis absorption analysis and TEM. Silver ion concentration controls the aspect ratio of these rods, providing a means to tune the aspect ratio of the rods between 1.5-4.0. FIG. 4 shows UV-vis absorbance spectra and TEM images for the gold nanorods. The aspect ratio (AR) of the gold nanorods can be controlled by varying the content of silver nitrate in the growth solution. The aspect ratio of the gold nanorods in these examples were tuned between 1.5-4. (i) AuNRs AR=1.5. (ii) AuNRs AR=2.0. (iii.) AuNRs AR=2.5. (iv) AuNRs AR=3. Scale bars are 100 nm. The gold nanorods produced by this method had a transverse diameter of approximately 12.0 nm and lengths ranging from 24.0-60.0 nm, consistent with known values for rods synthesized using a seeded growth approach. Using the millifluidic flow reactor, it has been demonstrated for the first time that AuNR aspect ratio can be predictably controlled during synthesis in a fluidic environment.

The gold nanoparticles prepared using the millifluidic reactor offer a product with comparable dispersity to AuNP products typically synthesized in batch. For instance, CTAB-stabilized AuNPs can readily be prepared in the reactor with a dispersity (1$\sigma$) of 10-20%, which is essentially identical to the dispersity reported for the original batch synthesis approach. The core diameter dispersity of the AuNP products prepared in the millifluidic reactor also compares favorably to AuNPs synthesized in microfluidic devices, which are also typically between 10-25% of the mean core diameter. Monodisperse nanoparticle synthesis is one of the oft-stated aims of AuNP synthesis in microfluidic reactors. However, various factors, including the spread of the fluid front within the narrow reaction channels, and aggregation within the narrow reactor channels, compete with the improved mixing and thermal transport within the reactor, giving a more polydisperse product. Therefore, despite the larger channel dimensions of a millifluidic reactor, the variety and quality of the particles have been shown to be very similar to those of particles produced by a microfluidic device.

In addition to providing AuNP products with controlled core diameter and good monodispersity, synthesis in the millifluidic reactor permits the synthesis of gold nanoparticles at higher concentrations than are typically achieved in batch. UV-vis absorbance spectroscopy was used to determine the concentration of AuNPs as synthesized. It was found that gold nanoparticles (both spherical AuNPs and AuNRs) could be synthesized at nanomolar concentrations (1.5-3.0 nM), which is greater than 10-times the concentration of AuNPs synthesized using the analogous batch techniques. This means that the throughput that can be achieved with the millifluidic reactor is between 0.5-1.6 mg/min, suggesting that gram-scale synthesis of any functionalized gold nanoparticle can be achieved simply by continuous running of the flow reactor.

Example 2

Controlling the Absolute Dimensions of Gold Nanorods

Not only can the aspect ratio and size of AuNRs and AuNPs be controlled, but also the shape and absolute dimensions of the AuNRs. Two syntheses of gold nanorods of irregular shape or size have been modified for the millifluidic flow environment.

First, gold nanorods with increased transverse diameter (i.e., 'fat' gold nanorods) are prepared by increasing the ascorbic acid concentration used in the seeded growth synthesis. An increased ascorbic acid concentration may lead to additional isotropic overgrowth following the initial anisotropic growth phase of nanorod formation. Accordingly, the ascorbic acid concentration in the seeded growth synthesis was increased from 1.1-2.0 mols ascorbic acid:mols Au(III). Increasing the ascorbic acid to gold ratio provided an opportunity to "coarsen" the rods, leading to increased transverse diameters.

Figure 5:
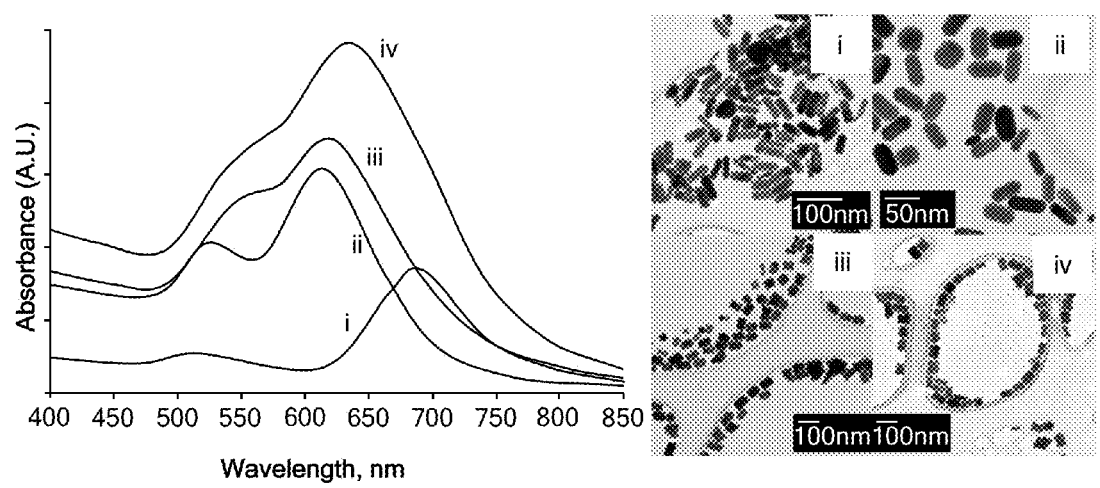
FIG. 5 shows UV-vis absorbance spectra and TEM images that illustrate the fine-tuning of the shape of the gold nanorods that can be achieved in the flow reactor.

FIG. 5 shows UV-vis absorbance spectra and TEM images that illustrate the fine-tuning of the shape of the gold nanorods that can be achieved in the flow reactor. By increasing the concentration of ascorbic acid, gold nanorods are overgrown to prepare 'fat' gold nanorods, or overgrown further to produce dog-boned gold nanorods or nano-cubes. Significant morphological changes in the rods were observed for every additional 0.3 mole equivalents ascorbic acid added.

FIG. 5 (i) shows gold nanorods prepared using the standard ascorbic acid concentration (Au:Asc A=1:1). Increasing the ascorbic acid concentration (Au:Asc A=1:1.4) leads to 'fatter' gold nanorods, the result of isotropic overgrowth around the gold nanorods, as shown in FIG. 5 (ii). After the addition of 1.4 molar equivalents of ascorbic acid, the rods maintained the same length (49.1±5.8 nm for (i) versus 47.1±7.8 nm for (ii)), but fattened slightly (19.1±4.3 nm for (b) and 22.6±5.4 nm for (c)), resulting in an aspect ratio decrease from 2.6±0.3 (b) to 2.1±0.2 (c) [N=50]. This caused a drop in longitudinal plasmon absorption maxima from 690 to 620 nm.

The addition of 1.7 mol equivalents of ascorbic acid to the reaction mixture (Au:Asc A=1.7) caused a further fattening of the gold nanorods, leading to the formation of dog-boned gold nanorods, as shown in FIG. 5 (iii). Finally, gold nanorods become enlongated cubes at the highest ascorbic acid concentration of 2.0 mol equivalents (Au:Asc A=2.0), as shown in FIG. 5 (iii). Scale bars are 100 nm.

The second adapted protocol involves a direct seedless reduction of Au(III) ions with borohydride in the presence of L-ascorbic acid. The transverse diameters of these "small" nanorods are interesting, in that they are only 4-10 nm, yet the aspect ratio-dependent optical properties of these AuNRs are quite similar to the optical properties of more common single-crystalline AuNRs with aspect ratios between 1.5 and 4.0.

Figure 6:
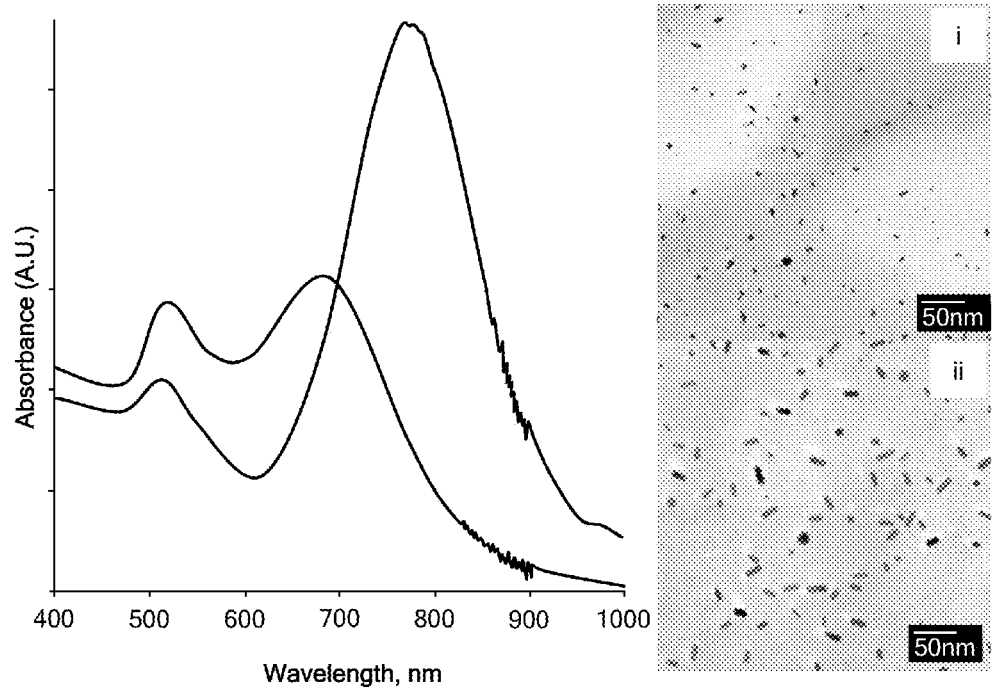
FIG. 6 shows UV-vis absorbance spectra and TEM images of gold nanorods with different aspect ratios that can be prepared by direct borohydride reduction.

The AuNRs produced by borohydride reduction had a transverse diameter of approximately 7 nm, and a longitudinal diameter of between 12 and 17 nm. The aspect ratio of these 'small' gold nanorods could be controlled by varying the concentration of sodium borohydride used in the synthesis. FIG. 6 shows UV-vis absorbance spectra and TEM images of gold nanorods with different aspect ratios prepared by direct borohydride reduction. The gold nanorods prepared in this way have smaller dimensions than those prepared using traditional seeded growth approaches. The AuNRs prepared by this approach have maximum dimensions of ~20×7 nm. FIG. 6 (i) shows small gold nanorods with aspect ratio ~2, and FIG. 6 (ii) shows small gold nanorods with aspect ratio ~3. Scale bars are 50 nm.

By decreasing the borohydride concentration used in the synthesis from 1.5 mM to 0.05 mM the aspect ratios of the rods were decreased from 3.0 (LSPR $\lambda_{max}$=795) to 2 (LSPR $\lambda_{max}$=660). The rods having the aspect ratio of 2 have a transverse diameter of 6.6±1 nm and a length of 13.5±2.2 nm, giving an average aspect ratio of 2.0±0.1 (N=100). The rods having the aspect ratio of 3.0 have a transverse diameter of 6.1±1.2 nm and a length of 16.5±3.8 nm, giving an average aspect ratio of 2.8±0.5 (N=100).

In addition to the unique size of these seedless-growth rods, their as-synthesized concentration in the millifluidic flow reactor is unusually high, reaching 10 Absorbance units (A.U.) as-synthesized for rods with a longitudinal plasmon of 760. It is also important to point out that the extinction coefficients for small rods are from 5 to 10 times lower than those for standard, seeded rods, likely due to a lower cross-section for the scattering process. Thus, assuming a typical as-synthesized absorbance of 1 A.U. for a standard rod batch, rods have been prepared in 50 to 100 times increased concentrations compared to previous seeded growth syntheses.

Figure 7B:
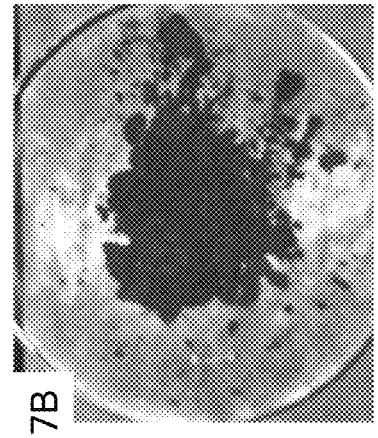
FIGS. 7A-7D show UV-vis absorbance and optical/TEM images for low-aspect ratio nanorods.
Figure 7D:
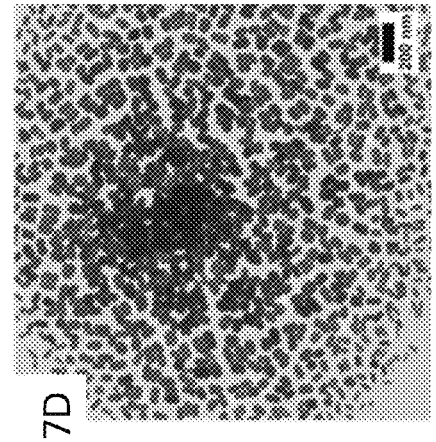
Figure 7A:
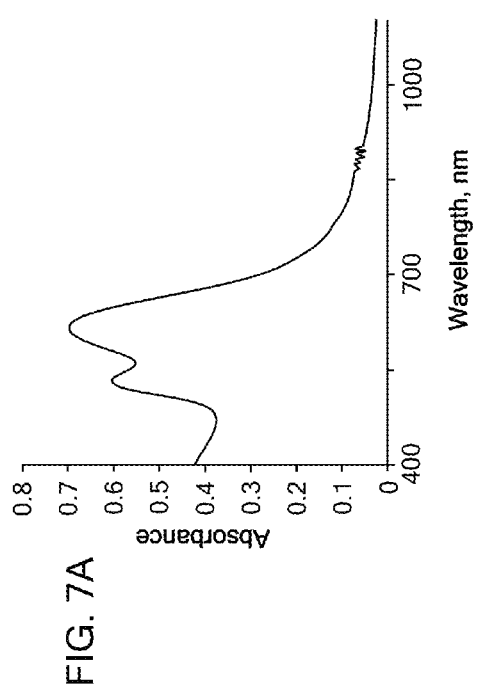
Figure 7C:
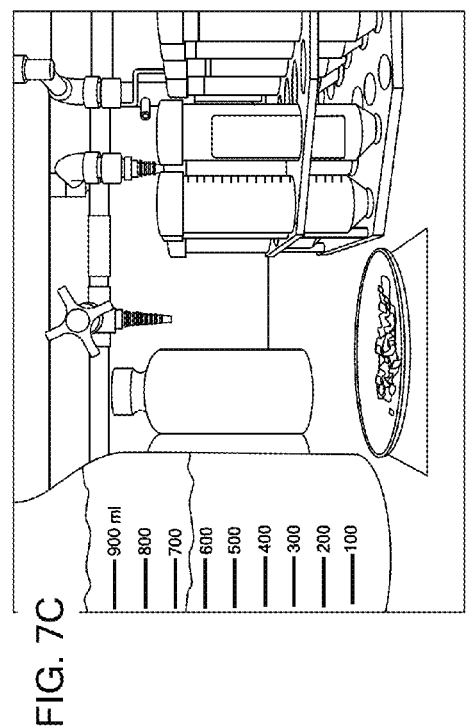

FIGS. 7A-7D show UV-vis absorbance and optical/TEM images for low-aspect ratio nanorods. The high-throughput synthesis enabled by the flow reactor facilitates the synthesis of mondisperse gold nanorods on a gram scale in a matter of hours. FIG. 7A shows a UV-vis absorbance spectrum of the low-aspect ratio gold nanorods. The sample has been diluted by a factor 10. This indicates a nanorod concentration of 1.5 nM. The yield of the AuNRs was confirmed by purifying and lyophilizing the gold nanorod sample. A sample of the lyophilized rods (103.6 mg, recovered from 100.0 mL of the AuNR solution) is shown in FIG. 7B. FIG. 7C shows lyophilized rods and the concentrated gold nanorods solution. FIG. 7D is a TEM image of the AuNRs prepared in the gram-scale synthesis. The AuNRs have dimensions of 97×45 nm, with a mean aspect ratio of 1.8±0.6 nm. Any gold nanorod aspect ratio between 1.5 and 5.0 can be prepared at the gram scale in the flow reactor.

The yield improvement of gold nanorods with smaller dimensions, but similar optical properties to previously reported AuNRs represents a significant accomplishment. Because smaller gold nanorods have a high absorption cross-section but a reduced scattering cross-section vs larger rods, they are interesting candidates as photothermal remediation agents. Their decreased stature may also grant them enhanced transport properties in biological systems. It should be noted that the synthesis of small AuNRs requires higher CTAB concentrations than standard gold nanorod synthesis by seeded growth (at CTAB and tetrachloroaurate concentrations that approach the limit of Au(III)-CTAB solubility), and therefore mixing the reagent streams in smaller volume elements (i.e., within the flow reactor) may grant significantly improved control over "small" AuNR synthesis performed in batch.

Example 3

Integrated Real-Time Optical Analysis of Gold Nanoparticle Products

The millifluidic reactor facilitates the real-time analysis of gold nanoparticle formation, simply by attaching a flow-through cuvette for UV-vis absorption spectroscopy analysis. The ability to monitor AuNP product formation in real-time facilitates mechanistic investigations as well applications for quality control during synthesis. Monitoring the progress of AuNP synthesis within the fluidic environment provides an opportunity for researchers to reduce wasted material, as the synthesis can be stopped immediately if contamination occurs during AuNP synthesis. The millifluidic reactor 100 can be adapted for real-time monitoring by attaching an in-line flow-through observation cell 165. The observation cell 165 can be placed at different distances from the mixer 120, providing an opportunity to monitor the steady-state AuNP population at different residence times, without interfering with AuNP synthesis (FIG. 1C).

To demonstrate the potential for real-time monitoring, the growth of small gold nanorods was tracked in the borohydride-mediated synthesis in real time in the millifluidic reactor. Absorbance spectra of the AuNR solution were taken at different residence times: 2, 4, 6, 8, 10, 12, 15, 20, and 25 min. Although the absorbance spectra initially show minimal absorbance features at two and four minute residence times, consistent with the formation of new nuclei (AuNPs<2.0 nm), between six and eight minutes, absorption features consistent with the formation of AuNRs begin to emerge. Ultimately, the transverse and longitudinal SPR peaks can be clearly seen centered at approximately 510 nm and 780 nm, respectively, with growth having terminated after approximately 25 minutes reaction time. Unlike the standard seeded growth synthesis of single-crystalline gold nanorods, these small gold nanorods experience very minimal blue-shift in the position of the longitudinal plasmon absorbance between 25 min and 24 hours of growth, suggesting that after 25 min, these small AuNRs have grown to their full aspect ratio quickly, and then experience no significant isotropic growth after this time. While the peristaltic pump used to drive synthesis in this millifluidic reactor is perhaps not ideal for detailed mechanistic investigations, we anticipate that similar millifluidic reactors that employ more narrow volume channels, while being powered by pumps that provide more consistent and controlled pressure (such as syringe pumps) might be ideal platforms for the mechanistic investigation of many different types of AuNP growth.

Example 4

Characterization of AuNP Surface Chemistry

Functionalized gold nanoparticles prepared in the flow reactor were analyzed by FTIR, TGA, XPS, and ζ-potential analysis to investigate the surface chemistry of the purified AuNPs. Prior to analysis, the AuNPs were purified by either centrifugation or extensive diafiltration (40 volume equivalents) to remove excess ligands and possible byproducts. ζ-potential analysis of the purified AuNP samples indicated that the ligand shell of all the AuNPs were fully formed, with each sample displaying the expected surface charge. MHA AuNPs showed a highly negative ζ-potential, while citrate AuNPs have only moderately negative ζ-potential values. All the CTAB-stabilized AuNPs show the expected positive ζ-potential values.

The successful formation of the ligand shell on the AuNP surfaces is further indicated by FTIR analysis of the purified AuNPs, which show absorbances for all the expected functional groups present in the spectra of the purified AuNP samples. In addition, XPS analysis indicates that the AuNPs prepared in the millifluidic reactor have a surface composition which is similar to the corresponding AuNPs prepared in batch. CTAB-stabilized AuNPs show peaks for gold, bromine, carbon, and nitrogen. CTAB-stabilized gold nanorods show the same peaks, but also show a peak for silver, which is consistent with the presence of silver(I) in their ligand shell as has previously been observed. No significant differences in composition were noted for the "small" AuNRs versus the "regular" single-crystalline AuNRs. XPS analysis of the MHA-stabilized AuNPs show the expected peaks for gold, carbon, and thiolate sulfur, indicating successful formation of the thiolate monolayer on the AuNP surface.

Based on the compositional analysis of the AuNP surfaces, it can be seen that functionalized AuNPs prepared in the millifluidic environment have comparable stability to AuNPs prepared by analogous batch techniques. Therefore, we expect that synthesis in the millifluidic environment protects both AuNP size control during synthesis and ligand shell quality, while facilitating superior throughput and control over the timing of reagent addition. Simply by running the reactor for a longer period, high quality functionalized AuNPs may be easily produced on the gram scale using this approach.

Example 5

Millifluidic Flow Synthesis of at Least a Gram of Gold Nanorods

Despite the fact that microfluidic devices (and other flow reactors) can, in theory, be numbered up ad infinitum to generate unlimited amounts of nanomaterial, neither the successful numbering up of microfluidic devices to generate a gram of functionalized nanomaterials, nor has the synthesis of a gram of functionalized gold nanoparticles ever been formally demonstrated. Indeed, many aspects of microfluidic AuNP synthesis (reactor fouling, fluid flow inhomogeneities, etc.) make it extremely challenging to operate the reactors long enough, or in sufficient synchrony, to prepare a gram of mondisperse gold nanorod product. In contrast, the synthesis of a gram of gold nanorods in the millifluidic flow reactor can be achieved simply by running the reactor continuously. The use of the millifluidic flow reactor to generate a gram of functionalized gold nanorods while maintaining precise control over AuNP properties has been explored.

Based on the estimated yield of our standard gold nanorods synthesis within the flow reactor, we calculated that 10.0 liters of the standard gold nanorod reaction solution would have to be prepared to generate 1.0 g of gold nanorods with aspect ratio 2. Accordingly, three separate 3.30 L fractions were synthesized in sequence, and combined to make a single 10.0 L solution of synthesized gold nanorods. To synthesize 10 L of gold nanorods in solution, three hours were required to mix the appropriate volumes of growth and seed solutions in the millifluidic flow reactor, and then the fractions were aged for a further three hours with stirring in an aqua regia-cleaned Erlenmeyer flask. After exiting the reactor, the synthesized nanorod solution is a deep blue color, indicating the formation of gold nanorods with AR~2.

All 10.0 L of gold nanorod solution were purified and concentrated by centrifugation, and analyzed by UV-Vis absorbance spectroscopy and TEM. FIGS. 4A and 4D show UV-Vis and TEM data for the gold nanorod solution. The UV-vis absorbance spectrum of the AuNR solution shown in FIG. 4 is for the as-synthesized AuNR solution diluted 10 times. TEM analysis of the gram scale synthesis samples indicates that the solution is composed of low aspect ratio (AR=1.83±0.3) gold nanorods with dimensions of 79.6±10.1×44.5±6.9 nm (N=50). The gold nanorods in this sample show good monodispersity, as can be seen for example in the TEM micrograph of FIG. 7D.

Based on the UV-vis absorbance data, it was estimated that 1.5 g of CTAB-stabilized gold nanorods had been synthesized. In order to verify the yield of gold nanorods produced by this method, the gold nanorods were purified by centrifugation, and the solution was concentrated by a factor of ten, and a fraction of the rod solution (250.0 mL) was lyophilized to determine a dry weight for the purified gold nanorods. 100.0 mL of lyophilized solution was found to yield 103.6±0.7 mg of a dry red-purple powder. This corresponds to an overall yield of 1.04±0.02 grams of CTAB-stabilized gold nanorods. This shows that gold nanorods can be produced on the gram scale using a simple flow reactor, while maintaining close control over gold nanorod properties, such as aspect ratio. This stands in contrast to previously reported gram-scale AuNR syntheses, where control over AuNR is limited, and the synthetic method has to be closely monitored and adjusted to maintain aspect ratio control.

Example 6

High-Throughput Functionalization of Gold Nanorods Using Tangential Flow Filtration (TFF)

In the past decade, a variety of techniques have been developed for the functionalization of gold nanoparticles, including ligand exchange with thiols and phosphines, layer-by-layer (LBL) polyelectrolyte wrapping, and silica coating. While these techniques readily facilitate the functionalization of milligram scale quantities of material, the functionalization of larger quantities of material remains a significant challenge, primarily because purification in these procedures is typically accomplished using low-throughput procedures, such as chromatography, centrifugation, dialysis, or solvent washing. Consequently, the development of high-throughput nanoparticle purification techniques has recently become the subject of extensive research.

The utility of TFF (tangential flow filtration) as a purification technique was explored to facilitate high-throughput nanoparticle functionalization in three separate instances: the removal of CTAB and small AuNP byproducts from the crude reaction product of gold nanorods synthesis, gold nanorod functionalization using LBL polyelectrolyte wrapping, and thiol exchange on gold nanorods. The TFF setup is shown schematically in FIGS. 1C and 1D. In each of these cases, the crude gold nanorod solution to be purified is added to the retentate reservoir 170, and then the sample is purified by passing 40.0 volume equivalents of eluent through the system. Gold nanorod purity is assessed by a combination of UV-vis absorption analysis, ζ-potential analysis, FTIR, XPS, and TGA. The results of the LBL functionalization of gold nanorods using TFF purification is described below, while the removal of excess CTAB from crude AuNR synthetic mixtures, and mPEG exchange are described elsewhere.

LBL polyelectrolyte wrapping of AuNRs was accomplished using a modified version of a previously reported standard polyelectrolyte wrapping procedure. In the modified procedure, excess CTAB was first removed from the AuNR synthetic solution. Next, the purified AuNRs are then concentrated and re-suspended in a 1.0 mM NaCl solution. The first polyelectrolyte, PAA, was then added to initiate wrapping, and was allowed to stir with the AuNRs for approximately thirty minutes. Following this wrapping stage, purification by TFF was begun. After purification, polyelectrolyte wrapping with the next polyelectrolyte, polyallyl amine hydrochloride (PAH), was initiated.

Figure 1D:
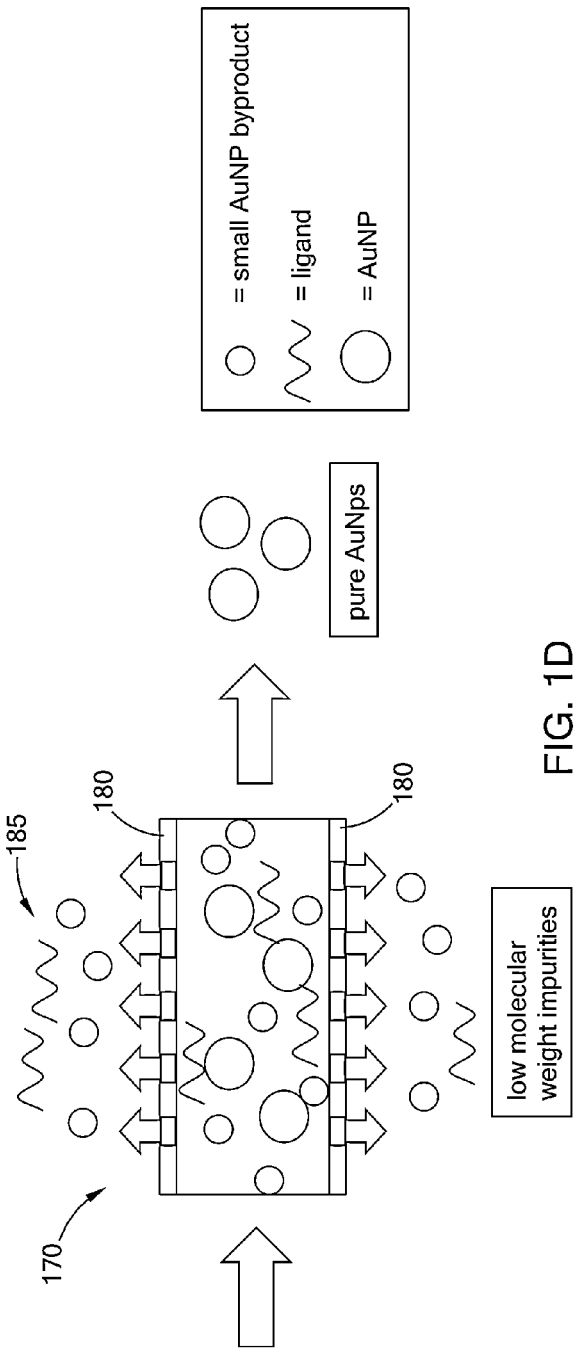
FIG. 1D shows schematically the effect of purification on a reacted solution comprising nanoparticles.

The TFF purification is driven by a peristaltic pump 155 attached to a commercially available diafiltration membrane. The polyelectrolyte wrapping solution is placed in the syringe 175, and the excess polyelectrolyte is removed by continuously circulating the AuNR solution (retentate) through the diafiltration membrane 180 of the retentate reservoir 170, while impurities are removed into the filtrate stream 185 (FIGS. 1C and 1D). The eluent in this purification procedure is 1.0 mM NaCl, which is added to the retentate periodically to preserve a constant volume. The AuNP solution is "pure" (i.e., ready for the next PE wrapping stage) after 20.0 volume equivalents of NaCl (relative to the initial PE wrapping solution volume) have been passed through the membrane. For example, to purify 20.0 mL of AuNR-PE solution, 400.0 mL of NaCl solution must be passed through the membrane.

Figure 8D:
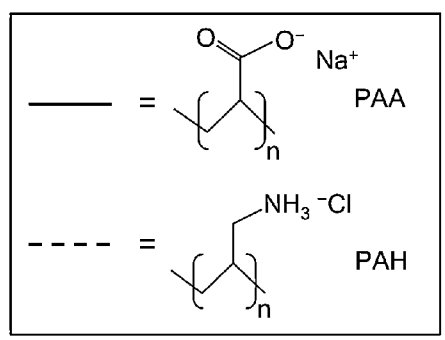
FIG. 8D shows the results of ζ-potential analysis after each purification stage by tangential flow filtration.
Figure 8D:
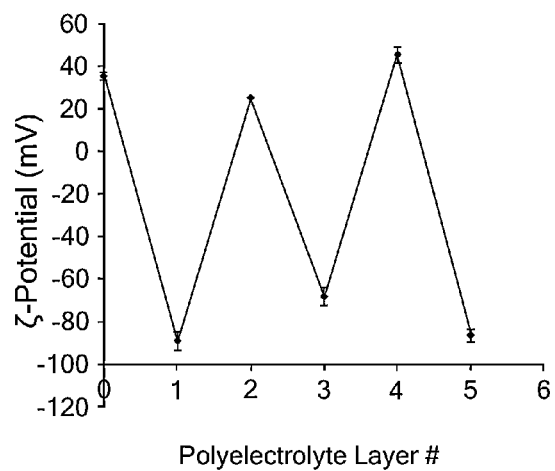

Functionalized gold nanorod purification in flow provides superior throughput versus standard purification approaches like centrifugation, as well as reducing product loss. AuNRs with five layers of polyelectrolyte (PAA-PAH-PAA-PAH-PAA) have been successfully wrapped using this approach. FIG. 8A shows UV-vis absorbance analysis for AuNRs functionalized using a conventional layer-by-layer wrapping approach (centrifugation), where significant product loss becomes apparent after just one layer of wrapping. FIG. 8B shows UV-vis absorbance data from an optimized layer-by-layer wrapping procedure, which minimizes product loss during purification, but reduces throughput. Still, significant losses are observed after just three layers of AuNR wrapping. Using tangential flow filtration, gold nanorods can be quickly purified during the LBL-wrapping procedure, and minimal product loss occurs, even after five layers of PE wrapping, as shown in FIG. 8C. The change in the $\lambda_{max}$ for the LSPR after each PE layer suggests that wrapping was successful at each stage. This was further confirmed by ζ-potential analysis of the AuNR solutions. Referring to FIG. 8D, ζ-potential analysis indicates that after each purification stage by TFF, the gold nanorods are well protected by the new layer of polyelectrolyte. Each wrapping cycle requires one to four hours to complete (including both wrapping and purification), depending on the volume of solution. The UV-vis absorbance spectrum of the AuNR solution after each wrapping stage shows no evidence of significant product loss after the first three wrapping stages. However, it is difficult to concentrate small AuNR batches to a constant volume because the existing TFF setup has approximately 20.0 mL of dead volume (the tubing and membrane volume between the exit point and re-entrance point for the retentate).

Polyelectrolyte wrapping with purification using TFF provides improved throughput in most cases versus polyelectrolyte wrapping using purification by centrifugation or dialysis. Typically, LBL purification by centrifugation or dialysis is a low-throughput procedure which limits the throughput to a maximum of ~0.005 mg/min.[1] In addition, centrifugation and dialysis are not readily scalable. In contrast, purification by TFF is scalable, and any volume of AuNR solution can be accommodated by this apparatus. Based on the UV-vis spectra shown in FIG. 3, the throughput of purification by TFF is estimated to be 0.76 mg/min, which is orders of magnitude faster than purification by centrifugation or dialysis.

[1] Centrifugation throughput calculation assumes a single batch (200.0 mL volume) of AuNR solution; 10.0 mg of AuNR/200.0 mL following AuNR synthesis. Also assumes 24 hour wrapping process with two centrifugation cycles at low speeds for complete polyelectrolyte removal with minimal product loss (~30 min/cycle).

Polyelectrolyte wrapping with purification by TFF also results in reduced loss of product compared to purification by centrifugation. UV-vis absorbance analysis of the AuNR product after five PE wrapping stages PAA-PAH-PAA-PAH-PAA shows no significant loss of product over the course of the five purification stages. In comparison, purification using a centrifugation protocol generally results in the loss of nearly one-quarter of the nanorods by the third LBL wrapping stage (FIG. 8A). The amount of product lost using the TFF procedure is even slightly less than the amount of product lost using an optimized centrifugation protocol (FIG. 8B), while providing superior throughput. Therefore, it appears that purification by TFF during polyelectrolyte wrapping not only provides improved throughput and scalability during purification, but also reduces the amount of product lost during the wrapping stages.

Experimental Details

Materials.

All materials were used as received, unless otherwise noted. Gold tetrachloroaurate trihydrate ($HAuCl_4 \cdot 3H_2O$), 6-mercaptohexanoic acid (MHA), sodium borohydride ($NaBH_4$), sodium polyacrylate (30% wt solution, PAA), polyallylamine hydrochloride (PAH), silver nitrate ($AgNO_3$) were obtained from Aldrich. Hexadecyltrimethyl ammonium bromide (CTAB), L-ascorbic acid, and trisodium citrate were obtained from Sigma. mPEG (MW=5000 kD) was obtained from NANOCS. Deionized water was prepared using a Barnstead NANOPURE water filter. Minimate tangential flow filtration capsules for AuNP purification, with pore sizes between 10 kD and 300 kD, were obtained from PALL. Two types of TEM grids, SiO on copper mesh (PELCO) and amine-functionalized Si/SiN SMART GRIDS (Dune Sciences) were used for transmission electron microscopy studies. The millifluidic flow reactor was assembled from commercially available components: a peristaltic pump (Cole-Palmer Masterflex L/S), Tygon polyvinyl tubing (ID=2.79 nm), Teflon Y-mixers, and joints.

Flow Reactor Assembly and Operation for Gold Nanoparticle Synthesis.

The millifluidic flow reactor was assembled from a peristaltic pump (Cole-Palmer Masterflex L/S), Tygon polyvinyl tubing, and Teflon mixers and joints as shown in FIG. 2. During synthesis, the reactor was operated at an overall flow rate of approximately 50.0 mL/min, which was found to be an optimal flow rate for nanoparticle synthesis. For the majority of gold nanoparticle syntheses, the reactor was assembled with sufficient tubing (550.0 cm) to give a residence time in the reactor of 3.0 min. Typically, AuNP size evolution is complete prior to the AuNP solution exiting the reactor, although not in the case of gold nanorod synthesis by seeded growth. Following elution from the reactor, the AuNP solution is collected in an aqua regia-cleaned 500.0 mL Erlenmeyer flask with stirring, and is held in the collection flask for 2-3 hours prior to characterization or functionalization.

4.0 nm Citrate-Stabilized Gold Nanoparticle Synthesis.

Citrate-stabilized AuNPs were synthesized according to the following procedure. 200.0 mL of a growth solution, containing 2.0 mM gold tetrachloraurate ($HAuCl_4$) and 6.0 mM sodium citrate, and 200.0 mL of a 5.0 mM aqueous sodium borohydride solution were prepared. The two solutions were flowed together in the reactor at a flow rate of 50.0 mL/min, and experienced a residence time of 3.0 min. The combined solutions rapidly change color to a deep brown, and then red-brown prior to exiting the reactor. The AuNP solution was collected in an aqua regia-cleaned 500.0 mL Erlenmeyer flask, and stirred for 3.0 hours.

3.0 nm Mecraptohexanoic Acid (MHA)-Stabilized AuNPs.

MHA-stabilized AuNPs were synthesized according to the following procedure. Briefly, 200.0 mL of a growth solution was prepared containing 3.0 mM $HAuCl_4$ and 6.0 mM MHA in nanopure deionized water. 200.0 mL of an aqueous 5.0 mM $NaBH_4$ solution was also prepared. The two solutions were flowed together at 50.0 mL/min. in the reactor, and experienced a residence time of 3.0 min. The combined solutions rapidly change color to a deep brown. The AuNP solution was collected in an aqua regia-cleaned 500.0 mL Erlenmeyer flask, and stirred for 3.0 hours.

2.0 nm, 8.0 nm, 20.0 nm, 40.0 nm CTAB-Stabilized AuNPs Synthesis.

CTAB-stabilized AuNPs were prepared using a modification of previously reported seeded growth procedures. All solutions were flowed through the pump system at a flow rate of 50.0 mL/min. Residence time was 3.0 min.

2.0 nm CTAB-Stabilized AuNPs Synthesis.

A growth solution was prepared containing 10.0 mM $HAuCl_4$ and 200.0 mM CTAB in 200.0 mL nanopure deionized water. This was combined with 200.0 mL of an aqueous 5.0 mM $NaBH_4$ solution. The combination of these solutions rapidly produces a deep brown solution.

8.0 nm CTAB-Stabilized AuNPs Synthesis.

A growth solution was prepared containing 10.0 mM $HAuCl_4$ and 200.0 mM CTAB in 200.0 mL nanopure deionized water. This was combined with 200.0 mL of an aqueous 0.02 mM $NaBH_4$ solution. The combination of these solutions rapidly produces a vibrant red solution.

20.0 nm CTAB-Stabilized AuNPs Synthesis.

The 8.0 nm CTAB-stabilized AuNPs were used as seeds in the synthesis of larger AuNPs. 20.0 nm CTAB-AuNPs were prepared by preparing a solution of 8.0 nm CTAB-stabilized AuNPs (see above, purified by centrifugation) by dissolving 10.0 mL of this solution in 50.0 mL of nanopure deionized water. This was added to a growth solution containing 1.0 mM $HAuCl_4$, 0.1 M CTAB, and 2.0 mM ascorbic acid. Shortly after mixing, the reaction solution turns from a clear, colorless solution to a vibrant red solution.

40.0 Nm CTAB-Stabilized AuNPs Synthesis.

The 20.0 nm CTAB-stabilized AuNPs were used as seeds in the synthesis of larger AuNPs. 40.0 nm CTAB-AuNPs were prepared by preparing a solution of 20.0 nm CTAB-stabilized AuNPs (see above, purified by centrifugation) by dissolving 10.0 mL of this solution in 50.0 mL of nanopure deionized water. This was added to a growth solution containing 1.0 mM $HAuCl_4$, 0.1 M CTAB, and 2.0 mM ascorbic acid. Shortly after mixing, the reaction solution turns from a clear, colorless solution to a vibrant red-purple solution.

Synthesis of Gold Nanorods Using a Seeded Growth Approach in the Flow Reactor.

Two solutions were prepared, labeled "Growth" and "Seed." For the growth solution, 1.25 mL $HAuCl_4$ (0.01 M), 55.0-250.0 μL $AgNO_3$ (0.01 M), and 137.5 μL L-ascorbic acid (0.1 M) were added to a 0.1 M aqueous CTAB solution with a final volume of 12.5 mL. For the Seed solution, 30 μL of a gold nanoparticle seed dispersion (aged 2 hours) was added to 12.47 mL CTAB (0.1 M). The solutions were mixed within the flow reactor (flow rate=50 mL/min), and the AuNR growth solution experiences a residence time of approximately 3.0 min in the reactor before depositing into a 50 mL conical tube.

Synthesis of Small Gold Nanorods Prepared by the Borohydride-Ascorbic Acid Method in Flow Reactor.

Two 25.0 mL solutions were prepared, labeled "Growth" and "Borohydride." For the growth solution, 0.5 mL $HAuCl_4$ (0.1 M) and 3.75 mL $AgNO_3$ (0.02M) were added to 20.75 mL CTAB (0.1M). The mixture was then mildly heated until no longer turbid, then cooled to room temperature before 0.5 mL of L-ascorbic acid (0.2M) was added. The growth solution was shaken until clear. For the sodium borohydride solution, 50-1700 μL of $NaBH_4$ (0.045 mM) was added to 29.95-23.3 mL of nanopure deionized water. The solutions were mixed together via the flow reactor at 50 mL/min before depositing, and were held in the millifluidic flow reactor for a residence time of 3.0 min, before being deposited into a 50 mL conical tube while stirring.

Synthesis of Seeded "Fat" Gold Nanorods in Flow Reactor.

Gold nanorods which have been modified by isotropic overgrowth to yield dog-boned gold nanorods and gold nanorods with large transverse diameters were prepared by increased ascorbic acid addition. Two solutions were prepared, labeled "Growth" and "Seed." For the growth solution, 18.62 mL CTAB (0.1M), 5.0 mL HAuCl$_4$ (0.01 M), 0.75 mL AgNO$_3$ (0.01 M) were combined and homogenized. Then, 0.63 mL L-ascorbic acid (0.1 M, 1.4 mol equivalents relative to HAuCl$_4$) were added, and the container was shaken until clear. For the Seed solution, 50-400 μL of 4.0 nm gold seed dispersion (aged 2 hours) were added to 25 mL CTAB (0.1 M). The solutions were combined in the flow reactor at 50 mL min$^{-1}$ before depositing in to a 50 mL conical tube. Typical nanorod concentration was 1.2 nM as synthesized.

Gram-Scale Synthesis of Gold Nanorods.

The gram scale synthesis of gold nanorods was achieved by using the conditions described below, and the AuNRs were continuously synthesized until approximately one gram of material has been produced. The synthesis of one gram of gold nanorods was sub-divided into three 3.3 L synthesis runs (final AuNR concentration of 1.0 nM). For each synthesis, 125 mL HAuCl$_4$ (0.01M) was combined with 5.5 μL of AgNO$_3$ (0.01M), and 137.5 mL L-ascorbic acid (0.1M) were added to a 0.1 M aqueous CTAB solution with a final volume of 1.65 L. For the Seed solution, 3.0 mL of a gold nanoparticle seed dispersion (aged 2 hours) was added to 1.65 mL CTAB (0.1 M). The solutions were mixed in the reactor at a constant flow rate of 50.0 mL/min, and the reaction solution experienced a residence time of three minutes within the reactor before the resultant blue solution was deposited into an aqua regia-cleaned 5.0 L Erlenmeyer flask with stirring. The solution was stirred overnight prior to purification.

Purification and Functionalization Approaches.

The purification and functionalization of gold nanorods are described below.

AuNP Purification by Tangential Flow Filtration (TFF).

Following synthesis, gold nanoparticle solutions were purified using one of two methods, either by centrifugation or using tangential flow filtration to remove unwanted small AuNP byproducts and free ligands (e.g., thiols, CTAB, or citrate). Purification by diafiltration requires the passage of 20-40 volume equivalents of solvent (e.g., nanopure water) through the membrane. CTAB-AuNR solutions could alternately be purified by centrifugation (2×@ 14000 RCF, 10 min.).

Thiol Exchange and Polyelectrolyte Wrapping with Purification Driven by TFF.

For polyelectrolyte wrapping, the purified AuNR solution was re-suspended in 1.0 mM NaCl, and wrapped by incubation with 10.0 mg/mL polyelectrolyte solution (either PAA or PAH, depending on the desired layer). The wrapping solution was stirred for three hours in a 60.0 mL Corningware tube. A separate TFF assembly is used for each type of polyelectrolyte layer (i.e., separate TFF assemblies for the purification of positively and negatively charged PE-AuNR solutions). Following polyelectrolyte wrapping, the functionalized gold nanorod solution is added to the TFF membrane and purified by diafiltration. Following purification, the purified gold nanorods solution is re-suspended in 1.0 mM NaCl solution and the polyelectrolyte wrapping procedure is repeated with the subsequent layer.

mPEG Thiol Exchange Driven by Diafiltration.

For mPEG thiol exchange, the purified CTAB-AuNRs were added to a 4 mg/mL solution of mPEG$_{(aq)}$, and the solution was stirred for twenty-four hours. At this time, the crude mPEG-AuNR solution is transferred to the diafiltration apparatus and purified by passing 20 volume equivalents of nanopure through the diafiltration apparatus.

Functionalized Gold Nanoparticle Characterization and Analysis.

Gold nanorod solutions were analyzed using a combination of UV-vis absorption spectroscopy, transmission electron microscopy (TEM), ζ-potential analysis, FTIR, x-ray photoelectron spectroscopy (XPS), and thermogravimetric analysis (TGA). UV-vis absorbance spectroscopy analysis was performed using a Cary 500 Scan UV-vis-NIR spectrophotometer. For transmission electron microscopy analysis, a small aliquot of the purified AuNP solution was dropcast onto a SiO/Cu mesh/formvar TEM grid (Ted Pella), and examined using a JEOL 2100 Cryo TEM. Size distributions for the AuNPs were determined using ImageJ analysis, according to previously reported procedures. For XPS analysis, purified AuNP solutions were dropcast onto indium foil and analyzed using a Kratos Axis Ultra XPS, with a monochromated Al X-ray source. For thermogravimetric analysis, purified AuNP samples were lyophilized and 3.0 mg were analyzed using a TA Insturments Q50 TGA. For FTIR analysis, purified AuNP solutions were dropcast onto a PTFE IR analysis card, and analyzed using a Thermo Nicolet 6700 FTIR Spectrometer.

TABLE 2

Spherical Gold Nanoparticles Synthesized in the Flow Reactor

| AuNP Sample | Ligand | Core Diameter (nm) | SPR $\lambda_{max}$ (nm) | Estimated Throughput[a] (mg/min) |
|---|---|---|---|---|
| 2.0 nm CTAB-AuNPs | CTAB | 2.0 ± 0.4 | — | — |
| 10.0 nm CTAB-AuNPs | CTAB | 8.2 ± 2.0 | 518 | 1.2 ± 0.10 |
| 20.0 nm CTAB-AuNPs | CTAB | 20.7 ± 4.5 | 532 | 0.57 ± 0.06 |
| 40.0 nm CTAB-AuNPs | CTAB | 37.0 ± 2.7 | 539 | 0.74 ± 0.04 |
| MHA-AuNPs | Mercapto-hexanoic acid | 2.2 ± 0.5 | — | — |
| Cit-AuNPs | Citrate | 4.9 ± 1.4 | 517 | 0.37 ± 0.05 |

[a]Throughput calculation based on AuNP concentration determined from UV-vis data
— AuNPs too small to determine accurate concentration from UV-vis

TABLE 3

Gold Nanorods Synthesized in the Flow Reactor

| AuNR Sample | Dimensions (nm) | SPR $\lambda_{max}$ (nm) | Estimated Throughput[a] (mg/min) |
|---|---|---|---|
| AuNR AR = 1.5 | 26 × 14 | 524, 604 | 0.58 ± 0.07 |
| AuNR AR = 2.0 | 22 × 12 | 508, 663 | 0.43 ± 0.02 |
| AuNR AR = 2.5 | 51 × 23 | 511, 736 | 0.25 ± 0.03 |
| AuNR AR = 3.5 | 40 × 14 | 509, 797 | 0.41 ± 0.04 |

TABLE 3-continued

Gold Nanorods Synthesized in the Flow Reactor

| AuNR Sample | Dimensions (nm) | SPR $\lambda_{max}$ (nm) | Estimated Throughput[a] (mg/min) |
|---|---|---|---|
| "Small" AuNR AR = 2 | 6 × 13 | 509, 660 | — |
| "Small" AuNR AR = 4 | 6 × 18 | 512, 795 | — |

[a]Throughput calculation based on AuNP concentration determined from UV-vis data
— [AuNR] could not be determined via UV-vis as the exctinction coefficients for the small AuNRs have not been determined In summary, it has been shown that a millifluidic flow reactor for nanoparticle synthesis can be assembled entirely from commercially available components that can be found in almost any chemistry laboratory. This reactor permits the high-throughput synthesis of functionalized nanoparticles with controlled sizes and shapes, which provides a facile means to prepare monodisperse nanoparticles on the gram scale. Although the focus of the examples presented herein is the synthesis of gold nanoparticles, many other types of inorganic nanoparticles may also be produced in the flow reactor, provided they can be synthesized in aqueous solution, with an appropriate choice of growth and reaction-initiating solutions.

The synthesis of the nanorods in the reactor can be fine-tuned to provide nanorods with controlled aspect ratios and absolute dimensions. For example, the dimensions of the nanorods can be deliberately coarsened within the flow reactor to provide "fat" nanorods, as well as "small" nanorods (e.g., AuNRs with absolute dimensions smaller than are typically achieved in seeded growth). The reactor can also be easily integrated with UV-vis absorbance spectroscopy analysis to provide real time analysis of the nanoparticle product. The reactor can further be integrated with tangential flow filtration to provide a high-throughput nanoparticle functionalization platform for hydrophillic functionalized AuNPs, for example. The millifluidic flow reactor represents a robust, high throughput nanoparticle synthesis device that can be assembled and operated by individual researchers in order to reproducibly synthesize gram-scale quantities of functionalized nanoparticles or facilitate high-throughput method development.

Although the present invention has been described in considerable detail with reference to certain embodiments thereof, other embodiments are possible without departing from the present invention. The spirit and scope of the appended claims should not be limited, therefore, to the description of the preferred embodiments included here. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A continuous flow method for nanoparticle synthesis, the method comprising:
    flowing a growth solution and a reaction-initiating solution into a mixing portion of a flow reactor to form a mixed solution, the flow rate of each of the growth solution and the reaction-initiating solution into the mixing portion being at least about 15 mL/min;
    flowing the mixed solution through a holding portion of the flow reactor for a predetermined residence time to form a reacted solution comprising nanoparticles; and
    continuously removing the reacted solution from the flow reactor so as to achieve a throughput of nanoparticles of at least about 0.5 mg/min.

2. The continuous flow method of claim 1, wherein the predetermined residence time is at least about 2 min.

3. The continuous flow method of claim 1, wherein the reacted solution includes the nanoparticles at a concentration of at least about 1 nM.

4. The continuous flow method of claim 1, wherein the growth solution comprises a gold precursor, a surfactant, and ancillary reagents.

5. The continuous flow method of claim 4, wherein the ancillary reagents include one or more of silver nitrate and ascorbic acid.

6. The continuous flow reactor of claim 1, wherein the reaction-initiating solution comprises a seed solution comprising gold nanoparticle seeds.

7. The continuous flow reactor of claim 1, wherein the reaction-initiating solution comprises a reducing agent.

8. The continuous flow reactor of claim 7, wherein the reducing agent comprises sodium borohydride.

9. The continuous flow method of claim 1, wherein the nanoparticles comprise gold nanoparticles.

10. The continuous flow method of claim 1, wherein the nanoparticles have an aspect ratio of from about 1.5 to about 4, the nanoparticles being nanorods.

11. The continuous flow method of claim 1, wherein a Reynolds number of the reacted solution flowing through the flow reactor is at least about 200.

* * * * *